United States Patent [19]
Dickerson, Sr.

[11] Patent Number: 5,584,622.

[45] Date of Patent: Dec. 17, 1996

[54] TIE DOWN DEVICE FOR VEHICLE

[76] Inventor: Donald L. Dickerson, Sr., 1508 Mission Hills La., Corinth, Tex. 76205

[21] Appl. No.: 402,338

[22] Filed: Mar. 10, 1995

[51] Int. Cl.⁶ .................................................. B60P 7/08
[52] U.S. Cl. ................. 410/21; 410/10; 410/12; 410/20
[58] Field of Search .................. 410/9–12, 16, 410/19, 20, 21, 23, 30, 50, 97, 100; 24/68 CD; 248/499

[56] References Cited

U.S. PATENT DOCUMENTS

| | | | |
|---|---|---|---|
| 1,770,798 | 7/1930 | Nicholson | 410/20 |
| 1,990,562 | 2/1935 | Otis | 410/20 X |
| 4,479,746 | 10/1984 | Huber | 410/21 |
| 4,611,961 | 9/1986 | Van Iperen et al. | 410/20 |
| 4,786,223 | 11/1988 | Crissy et al. | 410/20 |
| 4,960,353 | 10/1990 | Thorndyke | 410/20 |
| 4,993,898 | 2/1991 | Klahold | 410/12 |
| 5,160,223 | 11/1992 | Seitz | 410/20 X |
| 5,330,148 | 7/1994 | Floyd | 410/23 X |
| 5,458,447 | 10/1995 | Clason | 410/100 |

FOREIGN PATENT DOCUMENTS

| | | | |
|---|---|---|---|
| 100826 | 3/1962 | Netherlands | 410/20 |
| 715712 | 9/1954 | United Kingdom | 410/20 |

*Primary Examiner*—Karen B. Merritt
*Assistant Examiner*—Stephen Gordon
*Attorney, Agent, or Firm*—Ian C. McLeod; Mary M. Moyne

[57] ABSTRACT

A tie down device (10) for securing an automotive vehicle (100) by its wheels (104) and tires (102) into a transport vehicle (200), is described. The tie down device includes a first strap (12) and a second strap (16) with the second strap connected at its first end (16A) to the first strap near the first end (12A) of the first strap. The first end of the first strap has a first loop (14) which forms the first end (10A) of the device. The second end (16B) of the second strap has a second loop (18) which forms the intermediate end (10C) of the device. To configure the device, the second end (10B) of the device is passed first through the second loop and then through the first loop. The device is then positioned on the tire such that the second strap extends over the top of the tire on the wheel and the first strap extends around the tire. The second end of the device is wrapped around the spool (22A) of a ratchet (22) which is part of a securing mechanism (20) which connects the device to the bed (200A) of the transport vehicle. The first strap is able to slide within the loops in order to allow the device to adjust to any size wheel for better fit during tensioning.

12 Claims, 3 Drawing Sheets

5,584,622

TIE DOWN DEVICE FOR VEHICLE

BACKGROUND OF THE INVENTION

1. Field of the Invention

The present invention relates to a method and apparatus for securing an automotive vehicle onto a transport vehicle. In particular, the present invention relates to a unitary tie down device which mounts around the tire and wheel of an automotive vehicle and enables the automotive vehicle to be easily secured onto any type of transport vehicle.

2. Prior Art

The prior art has disclosed numerous tie down devices which are positioned around the wheel of the carried vehicle and are secured to the transport vehicle. Illustrative are U.S. Pat. No. 4,479,746 to Huber; U.S. Pat. No. 4,611,961 to Van Iperen et al; U.S. Pat. No. 4,786,223 to Crissy et al; U.S. Pat. No. 4,960,353 to Thorndyke and U.S. Pat. No. 5,330,148 to Floyd.

In particular, Floyd describes a wheel tie down device for securing the wheel of a towed vehicle to the trailer. The wheel tie down device consists of three major components, a lasso member, a cross member and a tether member. The lasso member comprises a linear member with a metal delta ring at one end. The other end of the lasso member is passed through the delta ring and extended a distance to subdivide the lasso member into a lasso loop and a lasso handle. The cross member spans the lasso loop and attaches by slip loops at points diametrically opposite one another on the lasso loop. The lasso loop is able to slide through the slip loops of the cross member when pulled to enable adjustment of the device for different size wheels. The tether member is attached by a slip loop to the lasso member at a point diametrically opposite the delta ring of the lasso loop. The tether member has a hook at the other end for securing to the trailer. The unencumbered end of the lasso handle of the lasso member is wound around the reel of a winch. As the winch is progressively tightened, the lasso loop constricts around the wheel assembly and assumes a linear configuration at the sides of the wheel assembly, thus defining a chord with respect to the round configuration of the wheel assembly.

Huber describes a wheel harness for securing a vehicle to a carrier during shipment. The harness includes a pair of linear webbing elements joined at their ends, an intermediate transverse webbing element connected to the linear webbing elements, a locking strap with a buckle at one end, connected intermediate its ends to the inner junction of the linear webbing elements and a tension member attached at one end to the outer junction of the linear webbing elements. In use, the harness is arranged over the inflated tire with the linear webbing elements arranged so as to position the attachment point of the locking strap at the rear of the wheel. The harness is positioned circumferentially on the tire so that the tension member will be aligned so as to substantially intersect the axis of the wheel when in its attached position. Once positioned, the ends of the locking strap are brought downwardly around the tire and secured together by means of the buckle in front of the tension member to form a locking loop. The locking strap is of a sufficient length such that the passage of the ends thereof across the tire tread takes place at points on the circumference of the tire which are spaced apart a distance less than the diameter of the tire and disposed spaced on the other side of the axis of the wheel from the point of attachment of the strap to the harness central portion. The portion of the locking loop which faces outwardly of the wheel normally extends substantially perpendicular to and overlapping the extending tension member and substantially parallel to and below a diameter of the wheel perpendicular to the tension member. Once the harness is in place and the locking strap tightened, the free end of the tension member may be fed into the spool of the attachment means on the deck of the vehicle carrier.

There remains a need for a tie down device and method for using the tie down device which is easy to use, which will not cause damage to the wheel and which can be used with any size carried vehicle and transport vehicle.

OBJECTS

It is an object of the present invention to provide a tie down device which is simple to use and quick to attach. Further, it is an object of the present invention to provide a method for securing a carried vehicle onto a transport vehicle which is quick and easy and which will work with any size transport vehicle. Still further, it is an object of the present invention to provide a tie down device which has no metallic parts and which will not damage the carried vehicle. Finally, it is an object of the present invention to provide a tie down device which is inexpensive and easy to manufacture. These and other objects will become increasingly apparent by reference to the following descriptions and to the drawings.

DETAILED DESCRIPTION OF THE PREFERRED EMBODIMENTS

The present invention relates to a tie down device for use around a rubber pneumatic tire with a road engaging tread which is mounted on a wheel of a vehicle and connected to a transport means, which comprises: a first fabric strap having opposed first and second ends and with a loop in the strap at the first end; and a second fabric strap having opposed first and second ends, with the first end of the second strap connected to the first strap adjacent to the first end of the first fabric strap and with a second loop at the second end of the second strap, wherein the first and second straps have a length so that when the tie down device is positioned around the tire, a first end of the tie down device is positioned with a second end of the device through the first loop with the first strap around the tire and the first loop on the tread and with the second loop adjacent a side of the wheel between the tread and wherein the second strap is around the tire and over an uppermost portion of the wheel and across the tread.

Furthermore, the present invention relates to a method for securing a vehicle onto a transport means which comprises the steps of: providing a tie down device for at least two wheels of the vehicle, the device having a first fabric strap having opposed first and second ends and with a loop in the strap at the first end; and a second fabric strap having opposed first and second ends, with the first end of the second strap connected to the first strap adjacent to the first end of the first fabric strap and with a second loop at the second end of the second strap, wherein the first and second straps have a length so that when the tie down device is positioned around the tire, a first end of the tie down device is positioned with a second end of the device through the first loop with the first strap around the tire and the first loop on the tread and with the second loop adjacent a side of the wheel between the tread and wherein the second strap is around the tire and over an uppermost portion of the wheel and across the tread; positioning the vehicle on the transport means; configuring each of the tie down devices by inserting the first end of the first strap through the second loop of the second strap and then through the first loop of the first strap; positioning each of the devices around each of the wheels so that the second strap extends over the uppermost portion of the wheel and across the tread, the second loop is adjacent a side of the wheel between the tread and the second end of the first strap extends outward away from the wheel; connecting the second end of the first strap of each of the devices to a securing means which has a ratchet mechanism for rolling the second end of the first strap to tension the tie down device between the tire and the transport means; and tensioning the securing means so that the devices are tightened around the tires and tensioned between the tire and the transport means.

Figure 1:
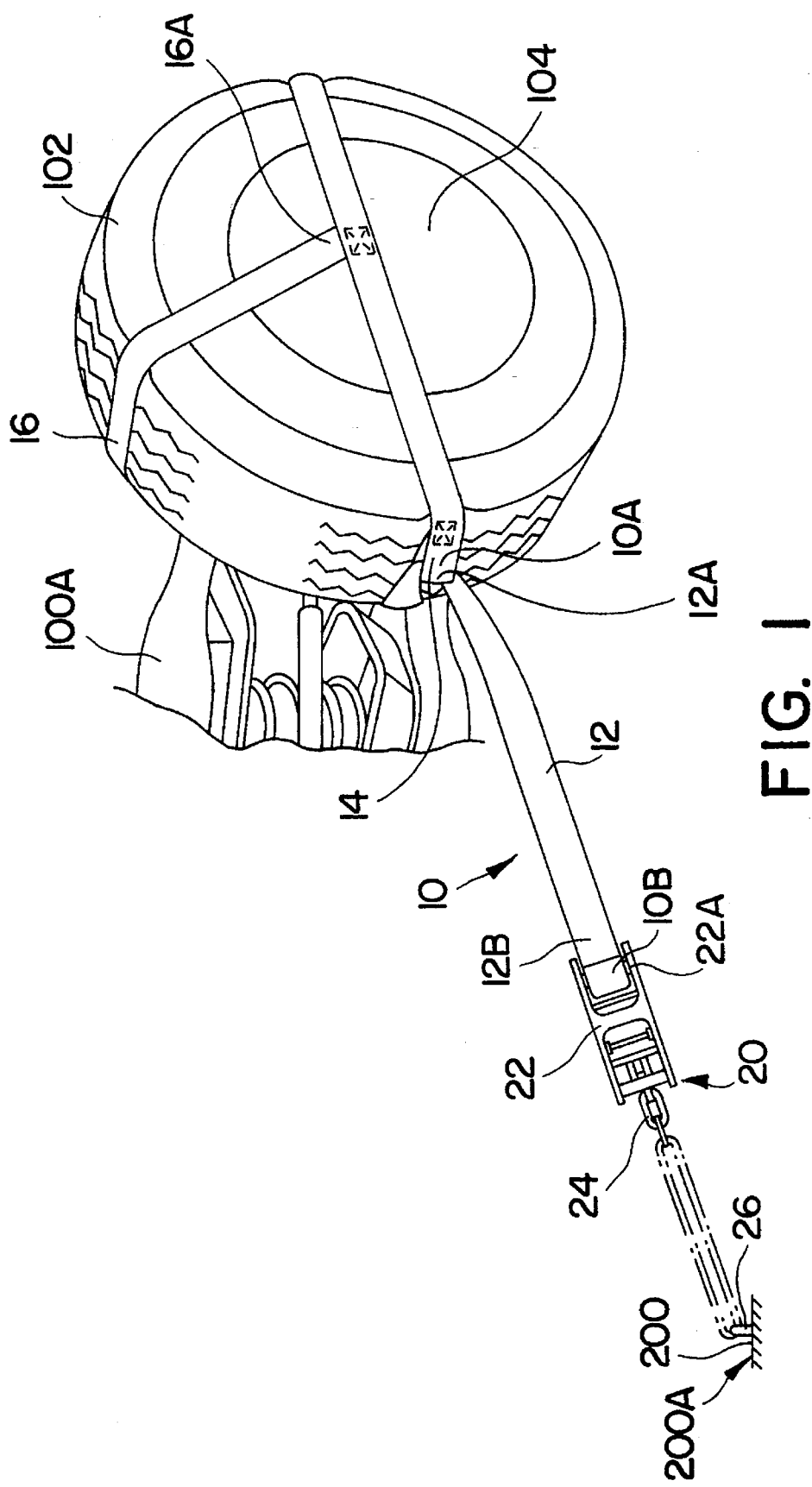
FIG. 1 is a perspective view of the tie down device 10 mounted around a front driver's side tire 102 and connected to a transport vehicle 200 by a tail chain 24 and ratchet 22.
Figure 2:
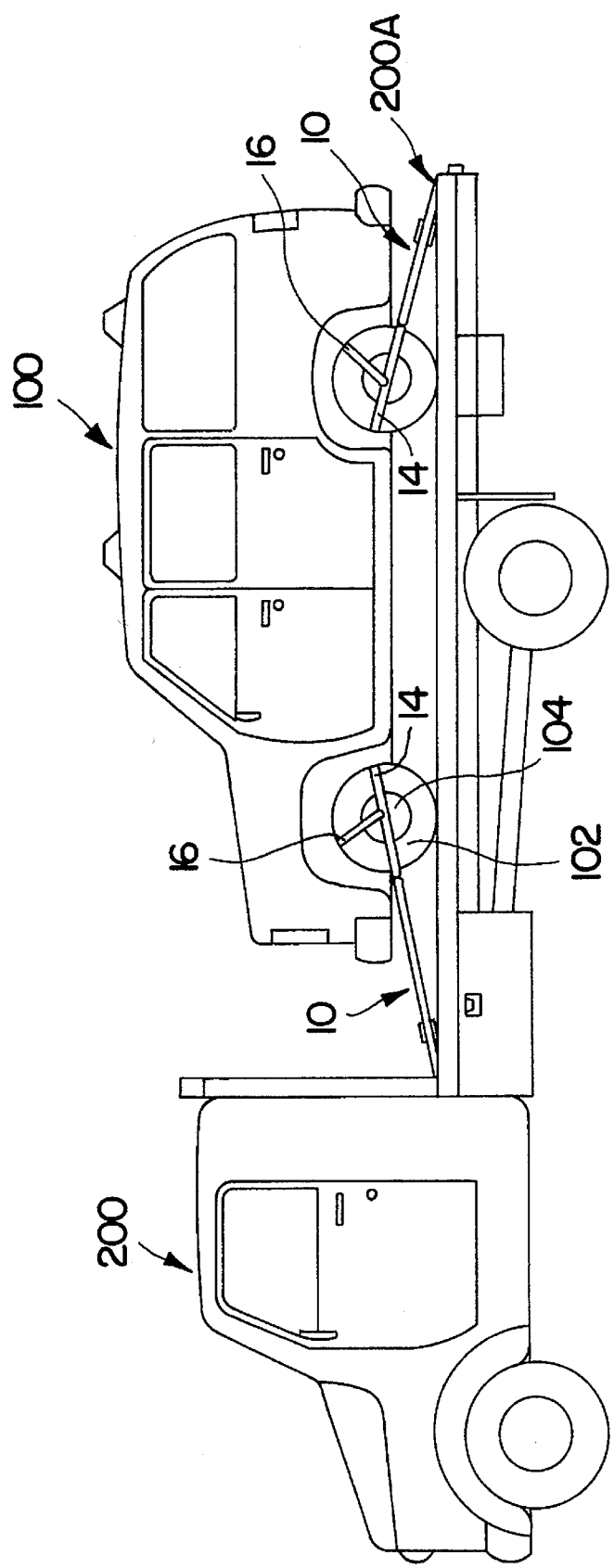
FIG. 2 is a side view of a carried vehicle 100 secured on the bed 200A of a transport vehicle 200 by two tie down devices 10.

FIGS. 1 to 4 show the unitary tie down device 10 of the present invention. The device 10 is preferably used to secure a carried vehicle 100 onto a transport vehicle 200. The transport vehicle 200 is preferably a conventional flat bed truck having no special provisions for mounting of the securing mechanism 20 (FIG. 2). The transport vehicle 200 could also be in the form of a flat bed trailer or a truck having a tiltable flat bed 200A. In the preferred embodiment, the transport vehicle 200 does not need to have any special hook up attachments for the device 10. The device 10 will work with transport vehicles 200 having a variety of different sized beds 200A. In addition, the carried vehicle 100 does not need to be specifically and accurately positioned on the bed 200A in order to correctly use the device 10 to secure the carried vehicle 100 to the transport vehicle 200. However, the securing mechanism 20 must be able to be attached onto the bed 200A or flat surface of the transport vehicle 200.

Figure 4:
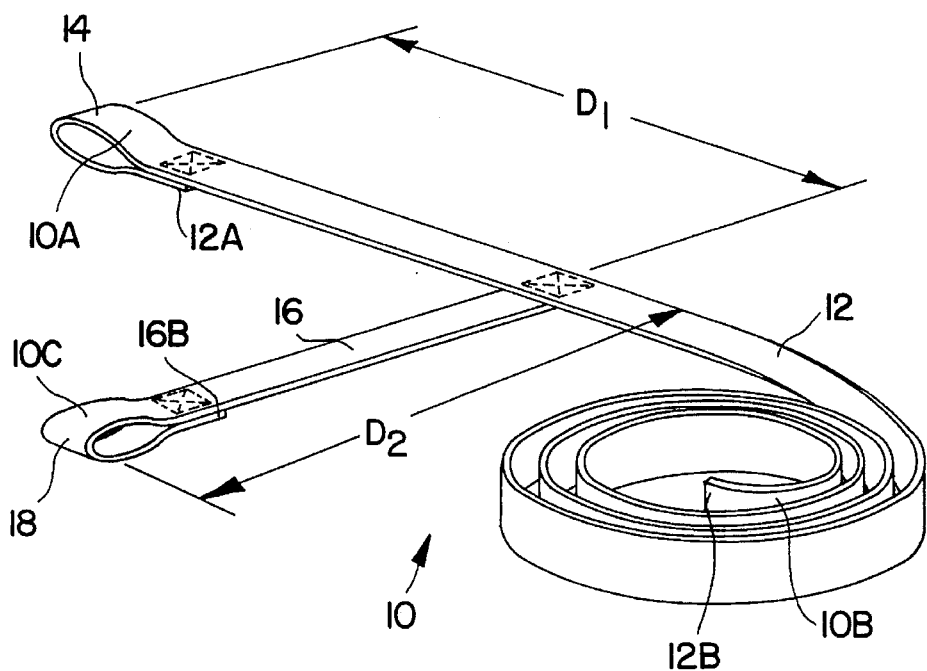
FIG. 4 is a perspective view of the tie down device 10 showing the first and second loops 14 and 18.

The carried vehicle 100 is preferably a conventional automobile having rubber pneumatic tires 102. The device 10 however can also be used with other types of vehicles having rubber pneumatic tires 102. The tie down device 10 has a first end 10A and a second end 10B with an intermediate end 10C therebetween (FIG. 4). The tie down device 10 is formed by a first strap 12 and a second strap 16 which are connected together. The first strap 12 has a first end 12A and a second end 12B with a first loop 14 located at the first end 12A of the first strap 12. The first end 12A of the first strap 12 forms the first end 10A of the device 10 and the second end 12B of the first strap 12 forms the second end 10B of the device 10. The first loop 14 in the first end 12A of the first strap 12 is preferably formed by folding the first end 12A of the first strap 12 back over onto the first strap 12 adjacent the first end 12A. The first end 12A is then sewed onto the first strap 12 forming the loop 14. In the preferred embodiment, the loop 14 is of such a size as to easily accommodate the width and thickness of the first strap 12 such that the first strap 12 can freely slide within the loop 14. The first strap 12 is preferably between about 8 and 12 ft (243.8 and 365.8 cm) long from the second end 12B to the end of the first loop 14 such that the size of the first loop 14 does not change the length of the first strap 12. The length of the first strap 12 is such that the device 10 is able to fit around a variety of sizes of pneumatic tires 102 and to be able to be used on a variety of sized transport vehicles 200. The thickness of the first strap 12 is about 0.080 to 0.115 inches (0.20 to 0.29 cm). The width of the first strap 12 is between about 2 and 3 inches (5.1 and 7.6 cm). The exact size of the first strap 12 will depend upon the diameter and width of the tire size of the carried vehicle 100 and the length of the bed 200A of the transport vehicle 200.

The second strap 16 of the device 10 has first and second ends 16A and 16B with a second loop 18 at the second end 16B. The second strap 16 is attached at its first end 16A to the first strap 12, near the first end 12A of the first strap 12. In the preferred embodiment, the distance $D_1$ from the end of the first loop 14 to the first end 16A of the second strap 16 is approximately about 16½ inches (41.9 cm) (FIG. 4). Preferably, the second strap 16 is mounted onto the first strap 12 perpendicular to the first strap 12 such as to form a T-shaped intersection. The second strap 16 is fastened to the first strap 12 by sewing such as to securely fasten the straps 12 and 16 together. The second end 16B of the second strap 16 provides the intermediate end 10C of the device 10. The second strap 16 is preferably of such a length as to extend from the center of the tire 102 on one side to the center of the tire 102 on the other side. In the preferred embodiment, the second strap 16 is considerably shorter than the first strap 12. The length of the second strap 16 $D_2$ is preferably between about 25 and 40 inches (63.5 and 101.6 cm) from the first end 16A to the end of the second loop 18 such as to enable the second strap 16 to fit over any size tire 102. As with the first strap 12, the size of the second strap 16 is independent of the size of the second loop 18. The ratio of distances $D_2$ to $D_1$ is important for allowing the device 10 to be able to be adjusted to fit a variety of sized tires 102 and to work effectively on any size tire 102. The second strap 16 preferably has the same width and thickness as the first strap 12. The second loop 18 is formed similarly to the first loop 14 by folding over the second end 16B of the second strap 16 onto itself and fastening the second end 16B to the second strap 16. Preferably, the second end 16B is fastened to the second strap 16 by sewing. Like the first loop 14, the second loop 18 is preferably of a size as to easily accommodate the width and thickness of the first strap 12 such that the first strap 12 can freely slide within the second loop 18. The loops 14 and 18 could also be constructed by other means and could be completely separate attachments to the straps 12 and 16. The first and second straps 12 and 16 are preferably constructed of polyester having a needleloom construction and having a breaking strength of 10,000 lbs such as that sold by D D Sling & Supply, Inc., Mequon, Wis. Other materials having similar weight characteristics can also be used. In the preferred embodiment, the entire device 10 is constructed of a fabric which reduces the likelihood of scratching or damaging the carried vehicle 100 during loading or unloading or transport of the carried vehicle 100. Preferably, the loops 14 and 18 are formed and the second strap 16 is attached to the first strap 12 by sewing. Preferably, the sewing is done in an x-like pattern in order to assure that the straps 12 and 16 are securely fastened. In addition, polyester thread is preferably used for the sewing in order to provide additional strength at the connection points.

The device 10 is secured to the transport vehicle 200 by a securing mechanism 20 (FIG. 1). The securing mechanism 20 includes a ratchet 22 and a tail chain 24. The second end 10B of the device 10 is wrapped around the spool 22A of the ratchet 22 which allows the ratchet 22 to roll the second end 10B of the device 10 onto the spool 22A such as to tension the device 10 around the tire 102. The ratchet 22 is preferably similar to those well known in the art such as the 2 inch standard handle sold by D D Sling Supply, Inc. of Mequon, Wis. which has a breaking strength of 11,000 lbs. (4,989 kgs) and a working load limit of 3,670 lbs (1,664 kgs). The ratchet 22 is preferably connected to the transport vehicle 200 by the tail chain 24. The tail chain 24 can either be permanently mounted onto the bed 200A of the transport vehicle 200 or can be removably attached such as by a hook 26 which is permanently mounted in the bed 200A of the transport vehicle 200. Preferably, the securing mechanism 20 is easily removed from the device 10 and the transport vehicle 200. In the preferred embodiment, the transport vehicle 200 does not need to be modified in order to allow securing of the securing mechanism 20 and thus, the carried vehicle 100.

IN USE

Figure 3:
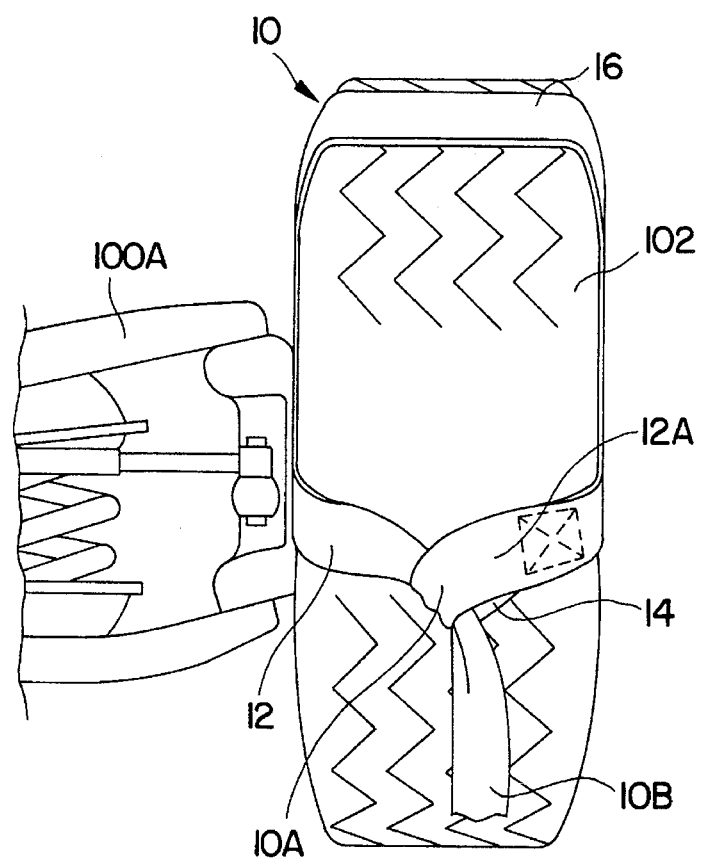
FIG. 3 is a front view of the driver's side tire 102 with the tie down device 10 positioned around the tire 102.

The carried vehicle 100 is first positioned on the transport vehicle 200. Next, the tie down devices 10 are configured in order to fit around the rubber pneumatic tires 102 on the wheels 104 of the carried vehicle 100. In the preferred embodiment, there are four (4) tie down devices 10 used for each carried vehicle 100 (FIG. 2). Preferably, the devices 10 are positioned on one tire 102 adjacent each of the four corners of the carried vehicle 100. To configure the tie down device 10, the second end 10B of the device 10 is passed through the second loop 18 of the second strap 16 at the intermediate end 10C of the device 10 and then through the first loop 14 of the first strap 12 at the first end 10A of the device 10. The second end 10B of the device 10 is inserted through the second loop 18 from the side opposite the first loop 14 of the first strap 12 such that after passing through the second loop 18, the second end 10B of the device 10 can be easily inserted through the first loop 14 at the first end 10A of the device 10. The second end 10B of the device 10 is inserted through the first loop 14 from the top such as to come down through the first loop 14 and out toward the securing mechanism 20 (FIGS. 1 and 3). Once configured, the devices 10 are then positioned on the tires 102. In the preferred embodiment, the devices 10 are configured before being positioned on the wheel 104 and tire 102. However, the devices 10 could be configured and positioned around the wheels 104 and tires 102 at the same time. In the preferred embodiment, the device 10 is positioned on the tire 102 such that the second strap 16 extends from about the center portion of the tire 102 on one side, over the top of the tire 102 to a center portion of the tire 102 on the opposite side (FIG. 3). However, the second strap 16 does not extend far enough such as to interfere with the axle (not shown) or steering mechanism 100A of the carried vehicle 100. The first end 12A of the first strap 12 having the first loop 14 is preferably adjacent the center tread of the tire 102 either at the front or at the rear of the tire 102 depending upon whether the device 10 is positioned on the front tire 102 or the back tire 102 of the carried vehicle 100, respectively. The first strap 12 extends from the first loop 14 around one side of the tire 102 and then around the other side of the tire 102 and back to and through the first loop 14. Preferably, the first strap 12 extends around the center of the tire 102 such that half the tire 102 is above the strap and half the tire 102 is below the strap 12 (FIG. 1). In the preferred embodiment, the first strap 12 contacts the tire 102 at the three o'clock position and the nine o'clock position. The first strap 12 is located such as to not interfere with or contact the parts of the carried vehicle 100 such as the axle or steering mechanism 100A attached to the inner side of the wheel 104. When tensioned around the tire 102, the first loop 14 with the first strap 12 extending through, acts as a slip knot to allow tensioning of the device 10 around the tire 102 (FIG. 3). The first loop 14 is preferably below the frame of the carried vehicle 100 such that the second end 12B of the first strap 12 does not come in contact with any part of the carried vehicle 100 except the tire 102, when the device 10 is fully tensioned on the tire 102. Preferably, the devices 10 are positioned on the tires 102 such that the second end 10B of the device 10 extends outward in front of the carried vehicle 100 when the device 10 is positioned on a front tire 102 or behind the vehicle when the device 10 is positioned on a back tire 102. Once positioned on the tire 102, the second end 10B of the device 10 is then wrapped around the spool 22A of the ratchet 22 of the securing mechanism 20. The securing mechanism 20 is then fastened by the tail chain 24 to the transporting vehicle 200 (FIG. 1). Alternately, the securing mechanism 20 is fastened to the transporting vehicle 200 prior to the insertion of the second end 10B of the device 10 into the securing mechanism 20. The length of the first strap 12 enables the device 10 to be used to position the carried vehicle 100 on a transport vehicle 200 with any size bed 200A regardless of the positioning of the fastening points of the securing mechanism 20.

Once all the devices 10 are correctly positioned on the tires 102 and connected to the securing mechanisms 20 then the ratchet 22 can be used to tension the devices 10 around the tires 102. In the preferred embodiment, the devices 10 are tensioned slowly in a given pattern. In the preferred method of tension, any one of the devices 10 is adjusted such as to be slightly tensioned around the tire 102. In the preferred embodiment, the first device 10 to be tensioned is one positioned on one of the front tires 102 of the carried vehicle 100 if the vehicle 100 is driven forward onto the transport vehicle 200. If the vehicle 100 is backed onto the transport vehicle 200, then preferably one of the devices 10 positioned on the rear tires 102 would be tensioned first. By first tensioning one of the devices 10 near the front of the transport vehicle 200, that device 10 tends to pull and hold the carried vehicle 100 on the transport vehicle 200 as the devices 10 are fully tensioned. Once the first device 10 is slightly tensioned, then the device 10 generally diagonal to the first tensioned device 10 is slightly tensioned. Thus, if the front driver's side were tensioned first, then the rear passenger's side would be tensioned second. Next, the remaining front tire 102 is tensioned and then the remaining rear tire 102 is tensioned. This pattern is repeated until all of the devices 10 are fully tensioned. Preferably, the ratchets 22 are slowly tightened such that it takes several times before the devices 10 are fully tensioned. When fully tensioned on the wheel 104 and pneumatic tire 102, the device 10 preferably causes a slight indentation in the areas of the tire 102 where the first and second straps 12 and 16 come in contact with the tire 102 (FIG. 1). In particular, the device 10 contacts the tire 102 at three places, mainly on the front and back of the tire 102, which are preferably at the same spot on opposite sides of the tire 102 and on the top of the tire 102 where the second strap 16 extends over the top of the tire 102. Depending upon which tire 102 the device 10 is positioned around, the second end 16B of the second strap 16 with the second loop 18 is adjacent either the inner side or the outer side of the wheel 104. As the device 10 is tensioned around the tire 102, the flexibility, thickness and width of the straps 12 and 16 allow the straps 12 and 16 to grasp the tire 102 and cause indentions in the tire 102. When fully tensioned, the device 10 cinches the tire 102 and compresses the pneumatic tire 102 at the three points of contact thus, causing indentions and thus, making it more difficult for the device 10 to slip off the tire 102 and wheel 104 once the device 10 is fully tensioned. The particular construction of the device 10 and the material used allows the user to tension the device 10 as much as possible without worrying about damaging the carried vehicle 100 or breaking the device 10. Thus, once the device 10 is fully tensioned on the wheel 104 and tire 102, the device 10 is unable to slip off due to the gripping action between the straps 12 and 16 and the tire 102. In addition, as the device 10 is tensioned, the first strap 12 easily slips through the first and second loops 14 and 18 which allows the device 10 to be adjustable such as to be able to fully grip any size pneumatic tire 102. Depending on the size of the tire 102, the second strap 16 may pull the first strap 12 upward at the first and second end 16A and 16B of the second strap 16 which may cause the different sections of the first strap 12 to be positioned differently. In addition, the second strap 16 may be positioned anywhere along the top of the tire 102 depending upon the size of the tire 102 and the best position for gripping of the tire 102. Once fully tensioned, the carried vehicle 100 is now ready to be transported (FIG. 2). To release and remove the carried vehicle 100 from the transport vehicle 200, the above process is repeated in reverse.

Numerous variations will occur to those skilled in the art. It is intended, therefore, that the foregoing descriptions be only illustrative of the present invention and that the present invention be limited only by the hereinafter appended claims.

I claim:

1. A tie down device for use around a rubber pneumatic tire with a road engaging tread which is mounted on a wheel of a vehicle and connected to a transport means, which comprises:

(a) a first fabric strap having opposed first and second ends and with a first loop in the strap at the first end wherein the first strap is of such a length as to extend completely around the tire with the second end of the first fabric strap inserted through the first loop at the first end of the first strap; and (b) a second fabric strap having opposed first and second ends, with the first end of the second strap fixably connected to the first strap between the first end and the second end of the first fabric strap and with a second loop at the second end of the second strap with the first strap slidably connected between the first and second ends of the first strap to the second loop of the second strap, wherein the second strap has a length so that when the tie down device is positioned around the tire, the first strap is positioned with the second end of the first strap through the first loop with the first strap around the tire and the first loop on the tread and with the second loop adjacent a side of the wheel between the tread and wherein the second strap is around the tire and over an uppermost portion of the wheel and across the tread.

2. The device of claim 1 wherein a securing means for tightening the device around the tire and for securing the device to the transport means is attached at the second end of the first strap.

3. The device of claim 2 wherein the securing means is a ratchet.

4. The device of claim 1 wherein the first and second fabric straps are constructed of polyester.

5. The device of claim 1 wherein the second strap is connected to the first strap by sewing.

6. The device of claim 1 wherein the first loop is made by folding over the first end of the first strap and connecting the first end of the first strap to the first strap adjacent the first end of the first strap.

7. The device of claim 1 wherein the second loop is made by folding over the second end of the second strap and connecting the second end of the second strap to the second strap adjacent the second end of the second strap.

8. The device of claim 6 wherein the first end of the first strap is connected to the first strap by sewing.

9. The device of claim 7 wherein the second end of the second strap is connected to the second strap by sewing.

10. The device of claim 1 wherein the first strap has a length of 144 inches (365.8 cm).

11. The device of claim 1 wherein the second strap has a length of 27 inches (68.6 cm).

12. The device of claim 1 wherein the first and second straps have a width of 2 inches (5.1 cm).

* * * * *